United States Patent [19]

Sordello

[11] 3,893,178

[45] July 1, 1975

[54] SYNCHRONIZATION OF MULTIPLE DISC DRIVES

[75] Inventor: Frank J. Sordello, Los Gatos, Calif.

[73] Assignee: Information Storage Systems, Inc., Cupertino, Calif.

[22] Filed: Dec. 19, 1973

[21] Appl. No.: 421,211

[52] U.S. Cl. .................. 360/73; 318/318; 346/137; 360/86; 360/98

[51] Int. Cl.²...G11B 5/012; G11B 15/52; G11B 5/82

[58] Field of Search ............ 360/73, 69, 71, 13, 86, 360/31, 75, 97–99; 317/5; 318/309–318, 69, 77, 326, 329; 346/137

[56] References Cited

UNITED STATES PATENTS

| | | | |
|---|---|---|---|
| 3,156,906 | 11/1964 | Cummins | 360/98 |
| 3,441,342 | 4/1969 | Ball et al. | 360/73 |
| 3,631,421 | 12/1971 | Perkins | 360/48 |
| 3,638,089 | 1/1972 | Garbor | 318/318 |
| 3,705,262 | 12/1972 | Kennedy | 360/73 |

*Primary Examiner*—Alfred H. Eddleman
*Attorney, Agent, or Firm*—Gerald L. Moore

[57] ABSTRACT

A control system for synchronizing the rotation of the recording discs of a plurality of disc drives so that the read/write heads of all of the drives will be at the same relative position on the rotating discs thereby reducing the latentcy time in switching between disc drives.

3 Claims, 2 Drawing Figures

SYNCHRONIZATION OF MULTIPLE DISC DRIVES

BACKGROUND OF THE INVENTION

In magnetic disc recording, usually a plurality of discs assembled together in a disc pack are mounted on a disc drive to form a plurality of recording surfaces on which data may be recorded and read back. There is provided a read/write head for each disc surface with a single actuator being used to position all of the heads in unison by movement along a radial line across the disc. The information is stored or recorded on data lines forming concentric circles on the disc surface.

All of the corresponding lines of the stacked discs rotating in unison form a cylinder such that the heads are all positioned over the data line included in a single cylinder at any one time. Thus when data is to be recorded on a plurality of lines, it preferably is recorded on the same lines of each cylinder by switching from head to head rather than by accessing a single head to adjacent lines because switching from head to head is much quicker than accessing the head assembly across the disc surface. On one point on the circumference of the discs, there is located an index point from which recording is always initiated on a particular data track. This index point is sensed in some manner within the disc drive such that the rotational position of the disc relative to the read/write head is known at all times. Thus, in switching from head to head, the recording ceases when the index point is reached and immediately starts on the next head at that same index point. It is possible that the data track itself is divided into sectors of the circle for discrete data recording; however, the index point is always used as the point of reference from which the position is sought.

When switching from head to head and recording and reading at random locations on the data tracks, there results a time delay while the disc rotates until the desired position is under the recording head. This time delay is known as the latentcy time during which the disc drive and controller, and possibly the central processing unit itself, must wait before the desired recording or reading operation can be initiated. Naturally, when switching from head to head for data positioned on track in the same cylinder, there is no latentcy time wait until the index point arrives since the switching will usually occur at that index point. However, in a usual disc drive subsystem, there will be up to eight or more disc drives connected to the single controller which can address only one disc drive at a time. This controller will switch from drive to drive depending upon the location of the information to be read or the desired position at which information is to be recorded. In present day systems, the controller must wait for the duration of the latentcy time period in switching from drive to drive because the disc packs in the subsystem are rotationally positioned in any random manner at any given instant. It is the purpose of this invention to reduce the latentcy time delay in a disc drive subsystem and thereby improve the operating efficiency of that subsystem.

SUMMARY OF THE INVENTION

A disc drive subsystem comprising a plurality of disc drives, each including at least one recording disc and a drive motor for rotating the disc, each drive also including at least one read/write head for each recording surface on the recording disc thereby to access various data tracks. The subsystem further includes means for sensing the rotational position of each of the rotating discs and for synchronizing the rotational position of all of the discs of the drives of the subsystem thereby to permit switching between the heads of one disc to another with a minimum latentcy time delay.

DESCRIPTION OF THE INVENTION

Figure 1:
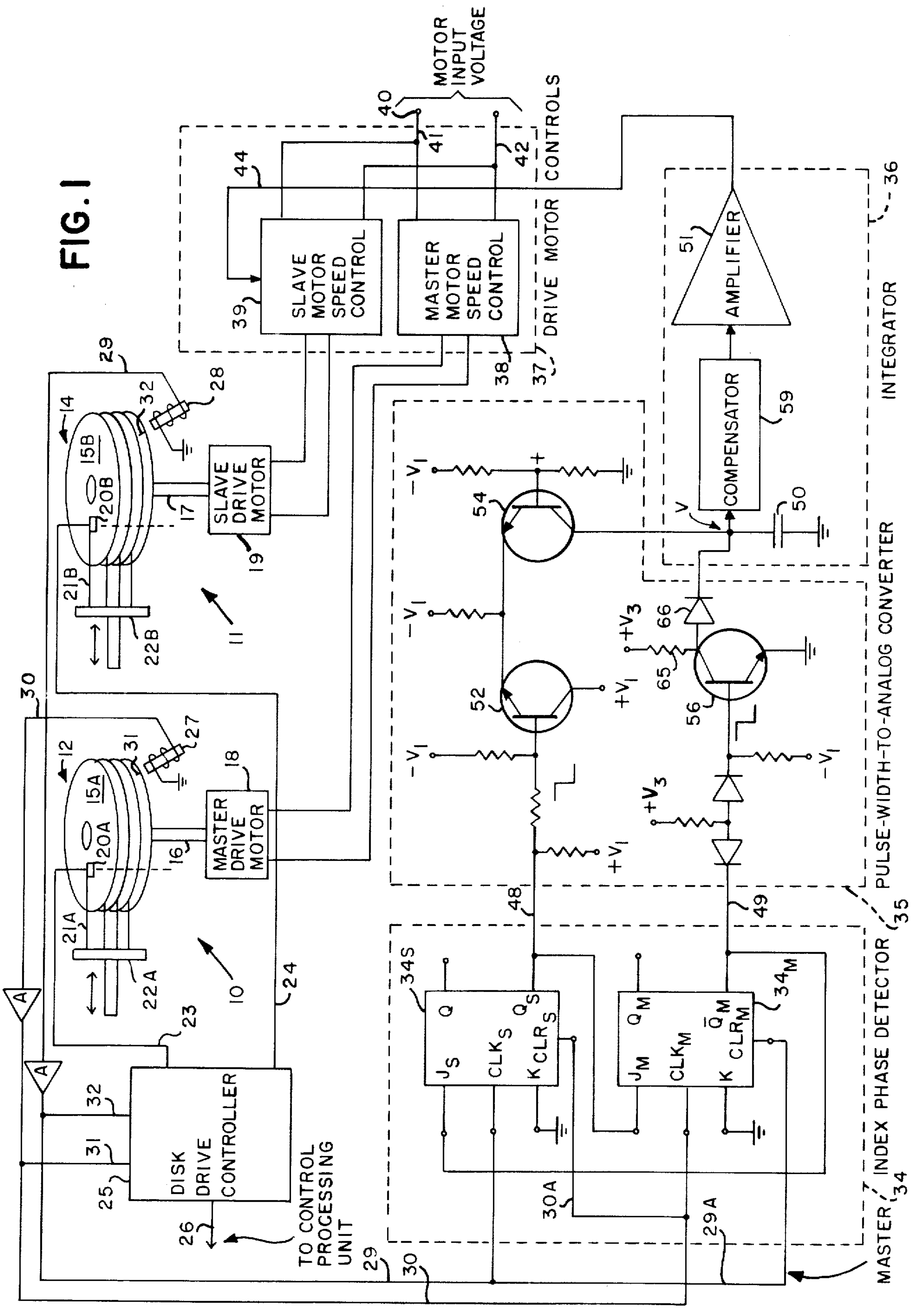
FIG. 1 is a schematic and block diagram of a disc drive subsystem employing this invention.

In FIG. 1 is shown a disc drive subsystem comprising the drives 10 and 11 including the disc pack 12 and 14 respectively. Each disc pack comprises a pluralilty of recording discs **15*a* and 15*b*** fixed so that they rotate together and are removable and replaceable as a single unit on each drive.

The disc packs 12 and 14 are attached to rotate with the shafts 16 and 17 which are driven by drive motors 18 and 19 so that the discs are rotated about the associated shaft axis. Each disc surface (usually both top and bottom) is coated with a magnetic material suitable for the magnetic recording of data thereon.

For reading and writing data on the disc surfaces, there usually is provided a plurality of read/write heads **20*a* and 20*b* for the drives 10 and 11 respectively which are mounted on arms 21*a* and 21*b* supported on carriages 22*a* and 22*b*** for movement radially across the respective disc surface. Fixed to the carriages are positioning devices for moving the carriages and attached heads relative to the disc pack in a manner described in U.S. Pat. No. 3,587,075, issued on June 22, 1971, and entitled CARRIAGE MECHANISM FOR DIRECT ACCESS DATA STORAGE DEVICE. It should also be recognized that the invention could be utilized with other types of disc drives, for instance with the fixed head file. Also in some apparatus, a single actuator could be utilized to actuate the read/write heads on a plurality of disc packs and the invention would still render the beneficial results of correlating the index points of the packs.

Thus, in the embodiment shown the plurality of heads of each drive are moved across the associated disc surfaces for recording data in concentric positions called data tracks which together form an imaginary vertically extending cylinder extending through the disc pack and described by the position of the corresponding tracks on all of the disc surfaces of a single disc drive. Connecting with each head is an electrical connection such as those illustrated by the lines 23 and 24 leading to a disc drive controller 25 suitable for transmitting data to the heads and receiving data from the heads after being read from the disc surfaces for processing of the data and/or transmission of the data to a central processing unit (not shown) through the transmission line 26. One such disc drive controller is shown in U.S. Pat. No. 3,408,631, and entitled RECORD SEARCH SYSTEM, issued Oct. 29, 1968.

Each disc drive 10 and 11 includes an index sensor 27 and 28 respectively for detecting the index point of the disc pack as the pack rotates and thereby moves the disc circumference past the fixed point. As shown here, the index sensor can be of any well known design such as optical or the magnetic core and associated coils 27 and 28 shown, each having one end grounded and the other end connected to one of the electrical connections 29 and 30. Thus each time the disc pack rotates, the sensor 27 or 28 detects a point 31 and 32 respectively on the disc packs which point can be a magnetic material insert which changes the permeability of the adjacent portion of the disc pack (usually a recording disc) so as to cause a pulse to be generated in the associated sensor which is transmitted from the coil through the connecting conductor. In this manner, the rotational position of the disc pack is sensed for assistance in locating precise positions circumferentially about the disc pack for the proper reading and writing of information on the recording disc surface. The index signals are transmitted to the controller through conductors 31 and 32 for such purposes. Also the index signal can be generated from signals prerecorded on the disc pack surfaces.

Thus the disc drive controller 25 can switch from head to head of a single disc drive and also switch between the heads of the various disc drives of the subsystem for recording and reading information. Each time a new head is indexed, especially between disc drives, the position of the head relative to the disc surface must be sensed by the use of the index signal so that data can be read or recorded at the desired circumferential positon on the disc surface. Naturally when the controller switches between heads of different disc drives in presently used subsystems, the circumferential positon of the disc packs is different such that a time delay is experienced before the rotating disc pack brings the index point under the head thereby allowing initiation of the read/write operation. This time delay is known as the latent time period and can involve that time which it takes the disc pack to rotate anywhere between 1° and 359°. It is the purpose of this invention to reduce the latent time delay within the disc drive subsystem in the manner described hereinafter.

In accordance with the present invention there is provided means for synchronizing the rotation of the disc packs on the disc drives within the subsystem, which means includes an index phase detector for detecting the relative rotational position of all of the disc packs for supplying a corresponding signal to a pulse-width-to-analog converter which generates a control signal adapted to energize a drive motor control for either speeding up or slowing down one drive motor relative to the other thereby to accelerate or decelerate the rotational speed of one disc pack until the index points arrive at the index sensor at the same time thereby synchronizing the rotation of the disc pack. The control provided is continuous in operation during use of the disc drive to assure that the disc packs remain in synchronization throughout the time operation of the disc drive subsystem.

Accordingly there is provided an index phase detector 34 which receives the index signals from disc drives 10 and 11 and generates a signal indicating which index signal occurred first and also indicates the time difference between the two signals for the purposes of adjusting the speed of one of the disc drive motors to bring the index signals of the separate drives together.

The phase sensor signal is fed to the pulse-width-to-analog converter 35 which generates a ramp voltage signal having a voltage change proportional to the time difference between the two index signals and having a positive or negataive slope dependent upon which index signal occurs first. This ramp voltage is generated by the integrator 36 and utilized as the control voltage for the drive motor control 37 which regulates the speed of the slave motor 19 for the purpose of adjusting the speed of rotation and the index position of the disc pack 14 to equal that of the disc pack 12 of the disc drive 10.

The drive motor control 37 comprises a master motor speed control 38 and a slave motor speed control 39 which independently regulate the speeds of the drive motors 18 and 19 respectively in any of several well known methods. A motor input voltage is supplied at the terminals 40 connected through the conductors 41 and 42 to the speed controls in parallel. In the embodiment shown, the motor 18 serves as the master drive motor and the speed and phase of the slave drive motor 19 is regulated to equal that of the master motor. Thus the master speed control 38 is adjusted in some suitable manner (not shown and preferably manually) to drive the disc pack 12 at a speed which is easily obtainable by the slave drive motor 19. Thereafter the slave motor speed control 39 is regulated by supplying an input signal through the conductor 44 suitable for regulating the slave drive motor speed to that of the master drive motor. The generation of the control signal supplied to the slave motor speed control is accomplished by use of the circuit to be described hereinafter.

To generate the motor speed control signal, there is utilized the index signals supplied through the conductors 29 and 30 to the index phase detector 34. These signals appear as signals 46 and 45 in the waveforms of FIGS. 2*b* and 2*a* of FIG. 2. As explained before, the purpose of the index phase detector 34 is to generate signals indicative of which index signal appears first and the time differential between the occurrence of the index signals. For this purpose there is provided a pair of flip-flops 34*m* and 34*s* having the interconnections shown. Such interconnected flip-flops are well known and generally function such that a signal appearing at the terminal CLK will cause a stepped voltage output at the terminals Q and an inverted stepped voltage output at terminal $\bar{Q}$. A signal at a terminal CLR will clear the flip-flop, that is, return the voltage level at terminal Q and $\bar{Q}$ to the original quiescent level. One suitable type of flip-flop circuit for use herein is type 74H103.

Figure 2:
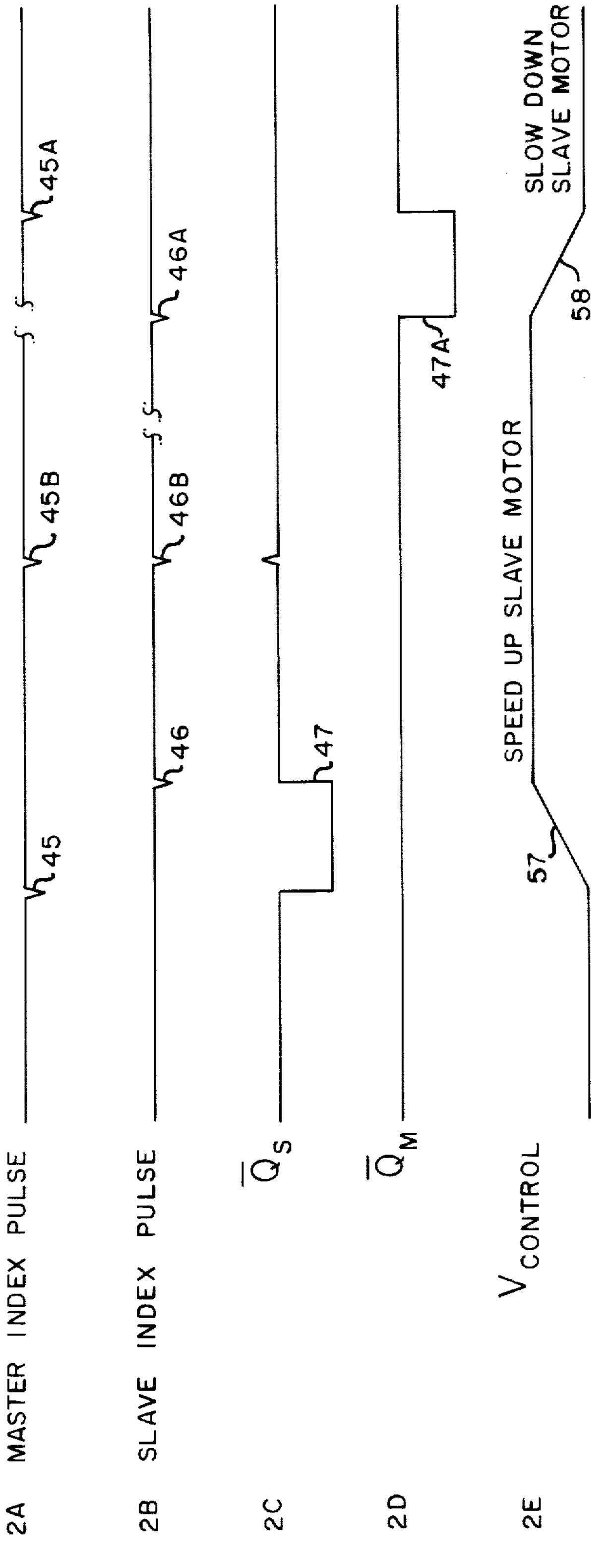
FIG. 2 is a series of waveforms for the generation of the index phase sensor signal.

To further explain the operation of the index phase detector 34, assume as shown in FIG. 2 that the index signal 45 from the master drive 10 appears first in time. There will appear at terminal $\bar{Q}_m$ (FIG. 1) the pulse 47 having a turn-on time corresponding to the index pulse 45. The index pulse 45 in being conducted through the conductor 30*a* also is transmitted to the terminal $CLR_s$ of the flip-flop 34*s*. The pulse 47 continues in duration until the index pulse 46 from the disc drive 11 occurs at which time the index pulse appears at the terminal $CLK_s$ of flip-flop 34s. However because this flip-flop has already received a signal at the $J_s$ terminal from $\bar{Q}_m$, no negative signal occurs at the output terminal $\bar{Q}_s$ thereof. The same index pulse 46 is transmitted through the connector 29A to the terminal $CLR_m$ of the flip-flop $34_m$. This resets the flip-flop to the normal level thereby causing the pulse 47 to be ended. Thus the occurrence of a signal at the terminal $\bar{Q}_m$ indicates the master index pulse preceded the slave index pulse and the duration of the pulse is indicative of the time differential between the two pulses.

In the same manner, if the slave index pulse precedes the master index pulse as shown by the pulse 46A and the pulse 45A, it can be seen by the same logic that the pulse 47A occurs at the terminal $\overline{Q}_s$ of the flip-flop 34s. The duration of this pulse indicates the time differential between the occurrence of the two index pulses. Thus there appears at the conductors 48 and 49 a signal generated by the index phase detector 34 which signal (depending upon at which terminal the signal appears) indicates which index signal preceded the other with the length of the pulse indicating the time duration between the index signals. It should be noted that as indicated by the pulses 45b and 46b, if the pulses occur simultaneously there will appear at each of the flip-flops a signal at the terminal CLR which immediately clears the flip-flop with the final result being no negative signal appearing at the terminals $\overline{Q}_m$ and $\overline{Q}_s$. Thus, if the index pulses are exactly synchronized no speed correction signal is indicated or needed.

The pulse-width-to-analog converter 35 changes the pulse signals received from the detector 34 into ramped voltages having a voltage dependent upon the duration of the detector pulse and a positive or a negative slope depending upon whether the slave motor needs to be accelerated or decelerated to cause the index signals to coincide. For this purpose, the ramped signal is supplied from the pulse-width-to-analog converter to a capacitor 50 with the resultant voltage on the capacitor being amplified by the amplifier 51 and supplied to the slave motor speed control 39 for regulating the slave motor speed.

The pulse-width-to-analog converter 35 includes transistors 52, 54 and 56. These transistors are properly biased by the voltages $-V_1$, $+V_1$ and $+V_3$ in the manner shown such that with the appearance of the voltage pulse 47A on conductor 48, the transistors 52 and 54 will cooperate to decrease the voltage level on the capacitor 50. Similarly with the appearance of the pulse 47 on the conductor 49, the transistor 56 will be turned ON to increase the voltage level of the capacitor 50.

The transistor 52 is normally conductive in the absence of any negative pulse at the terminal $\overline{Q}_s$ of the flip-flop 34s. Conduction by the transistor 52 maintains the emitter of transistor 54 at a positive potential relative to the base potential to render transistor 54 nonconductive. With a negative pulse 47A appearing at terminal $\overline{Q}_s$, the base of transistor 52 goes negative to shut off current flow, and transistor 54 turns ON to initiate discharging of the capacitor 50 at a constant rate. Charging of the capacitor continues for the duration of the pulse 47A. Similarly with a negative-going pulse at terminal $\overline{Q}_m$, the transistor 56 halts conduction such that the current through resistor 65 conducts through diode 66 to charge the capacitor 50. Thus the pulse 47 results in an upward ramping of the voltage on capacitor 50 as indicated on FIG. 2E at waveform portion 57, similarly waveform portion 58 occurs when a pulse 47A appears at terminal $\overline{Q}_s$. Since the voltage in capacitor 50 is utilized to control the slave motor speed control 39 after amplification in amplifier 51, the slave motor speed is increased and decreased by the appearance of pulses at terminals $\overline{Q}_m$ and $\overline{Q}_s$ respectively. Logically, the sequence follows since it is necessary to speed up the slave motor if the master index pulse occurs first, and vice versa. The compensator 59 is utilized to correct the margin of the control signal to assure stability in the servo control loop.

That which is claimed is:

1. A disc drive subsystem having a plurality of rotating discs each having an index point utilized to assist in the location of specific locations radially about the discs, including:

adjustable drive means for rotating the discs at desired rotational speeds;

means to signal the arrival of each index point at a predetermined location on the drive, and circuit means to detect the relative position of the index points and regulate the speeds of the drive means to adjust the speed of rotation of the discs thereby to cause the index points to arrive at the respective predetermined locations concurrently.

2. A disc drive subsystem as defined in claim 1 wherein one drive means is the master and all other drive means are slaves, and the circuit means is adapted to regulate the speed of rotation of the slave drive means to cause the index points to arrive at the respective predetermined locations concurrently with the master drive means.

3. A disc drive subsystem as defined in claim 2 wherein the circuit means to detect the relative position of the index points includes means to generate a voltage signal having a positive or negative polarity depending on whether the master or slave index signal occurs first, and having a magnitude dependent on the time differential between the points, and means to regulate the slave drive motor speed in response to the voltage signal magnitude and polarity.

* * * * *